US008676363B2

(12) United States Patent
Inoue et al.

(10) Patent No.: US 8,676,363 B2
(45) Date of Patent: Mar. 18, 2014

(54) INFORMATION PROCESSING APPARATUS, AUDIO SIGNAL PROCESSING METHOD, AND PROGRAM PRODUCT

(75) Inventors: Shigeru Inoue, Tokyo (JP); Shinya Okada, Kanagawa (JP)

(73) Assignee: Sony Corporation (JP)

( * ) Notice: Subject to any disclaimer, the term of this patent is extended or adjusted under 35 U.S.C. 154(b) by 810 days.

(21) Appl. No.: 12/661,278

(22) Filed: Mar. 12, 2010

(65) Prior Publication Data

US 2010/0249962 A1 Sep. 30, 2010

(30) Foreign Application Priority Data

Mar. 26, 2009 (JP) ................................ P2009-076971

(51) Int. Cl.
*G06F 17/00* (2006.01)
*H04R 29/00* (2006.01)
*H04J 3/06* (2006.01)

(52) U.S. Cl.
USPC ................................ 700/94; 381/58; 370/513

(58) Field of Classification Search
CPC ............ H04N 21/434; H04N 21/4344; H04N 21/23608; H04L 29/06027; G11B 20/10527; G11B 20/1262; G11B 20/1813; G11B 27/323; G06F 3/16; G06F 3/162; G06F 3/165; H04B 1/007
USPC ............... 370/504, 513; 381/56, 58; 386/214, 386/217, 220; 700/94
See application file for complete search history.

(56) References Cited

U.S. PATENT DOCUMENTS

| | | | | |
|---|---|---|---|---|
| 5,742,623 | A * | 4/1998 | Nuber et al. | 714/798 |
| 5,818,539 | A | 10/1998 | Naimpally et al. | |
| 6,219,339 | B1 | 4/2001 | Doshi et al. | |
| 6,226,608 | B1 * | 5/2001 | Fielder et al. | 704/503 |

(Continued)

FOREIGN PATENT DOCUMENTS

| | | | |
|---|---|---|---|
| CN | 1173783 | A | 2/1998 |
| JP | 2001035097 | A | 2/2001 |

(Continued)

OTHER PUBLICATIONS

Office Action from Japanese Application No. 2009-076971, dated Oct. 30, 2012.

*Primary Examiner* — Jesse Elbin
(74) *Attorney, Agent, or Firm* — Lerner, David, Littenberg, Krumholz & Mentlik, LLP

(57) ABSTRACT

An information processing apparatus includes a communication unit, an incoming data determining unit, and an audio processing command generator. The communication unit communicates with an external apparatus that splits outgoing audio data and sequentially sends transmission audio signals, each signal having a header and transmission audio data containing some of the split audio data with an appended first counter. The incoming data determining unit determines the existence of continuity-related errors in a received transmission audio signal, on the basis of the first counter, as well as a second counter contained in the header. The audio processing command generator selectively generates an audio processing command on the basis of the determination results in the incoming data determining unit, wherein the audio processing command stipulates audio data playback processing to be conducted in the event of an error.

9 Claims, 10 Drawing Sheets

(56) References Cited

U.S. PATENT DOCUMENTS

| | | | | |
|---|---|---|---|---|
| 6,542,518 | B1 | 4/2003 | Miyazawa | |
| 6,912,218 | B1 | 6/2005 | Jeon | |
| 2001/0023444 | A1 | 9/2001 | Torii | |
| 2003/0185238 | A1* | 10/2003 | Strasser et al. | 370/509 |
| 2004/0028045 | A1 | 2/2004 | Cheng | |
| 2004/0076194 | A1* | 4/2004 | Okamoto et al. | 370/537 |
| 2007/0067472 | A1* | 3/2007 | Maertens et al. | 709/230 |

FOREIGN PATENT DOCUMENTS

| | | | |
|---|---|---|---|
| JP | 2001-157208 | A | 6/2001 |
| JP | 2001-251388 | A | 9/2001 |
| JP | 2003023413 | A | 1/2003 |
| JP | 2004165886 | A | 6/2004 |
| JP | 2004272262 | A | 9/2004 |
| JP | 2006279559 | A | 10/2006 |
| JP | 2007194704 | A | 8/2007 |
| WO | WO-98-43423 | A1 | 10/1998 |

* cited by examiner

INFORMATION PROCESSING APPARATUS, AUDIO SIGNAL PROCESSING METHOD, AND PROGRAM PRODUCT

CROSS-REFERENCE TO RELATED APPLICATION

The present application claims priority from Japanese Patent Application No. JP 2009-076971 filed in the Japanese Patent Office on Mar. 26, 2009, the entire content of which is incorporated herein by reference.

BACKGROUND OF THE INVENTION

1. Field of the Invention

The present invention relates to an information processing apparatus, an audio signal processing method, and a program product.

2. Description of the Related Art

Recently, due to improvements in transfer speeds over wired and wireless communications and the increasing prevalence of networks such as the Internet, it is becoming increasingly common to see content usage patterns wherein content data send from one information processing apparatus is received and played back on another information processing apparatus.

When transferring content data between information processing apparatus in this way, the receiving information processing apparatus might become unable to receive part of the signal expressing the content data (i.e., the signal might be cut off), due to degraded communication, for example. At this point, if the content data is audio-containing data, then there is a possibility that an undesirable event may occur when the signal is cut off as described above. For example, noise may be produced in the audio being played back.

Given these circumstances, technology for detecting discontinuity in an incoming signal is being developed. For example, International Publication No. 98/43423 Pamphlet discloses technology wherein a header provided with a counter is appended to data (i.e., a payload) expressing video and/or audio. Doing so enables the determination of whether or not an incoming signal has been rejected mid-transfer.

SUMMARY OF THE INVENTION

In the technology of the related art for detecting discontinuity in an incoming signal (hereinafter simply referred to as the technology of the related art), the transmitting information processing apparatus transmits a signal provided with a counter in its header. Consequently, by referencing the counter in the header included in the incoming signal, the receiving information processing apparatus might be able to detect discontinuity in the received signal. However, the technology of the related art detects discontinuity in an incoming signal merely on the basis of a counter provided in the header. In other words, even if there are, for example, dropped bits in the data (i.e., payload) contained in an incoming signal from the transmitting information processing apparatus, a receiving information processing apparatus using the technology of the related art will not detect a discontinuity if the value of the counter set in the header is normal.

At this point, consider the case where the incoming signal contains, for example DSD (Direct Stream Digital) data (i.e., a payload). In other words, the incoming signal contains digital audio data obtained by using DSD to apply 1-bit delta-sigma ($\Delta\Sigma$) modulation to an analog audio signal. In this case, problems such as dropped bits lead to noise. However, in the technology of the related art, discontinuity is not detected when the value of the counter set in the header is normal, and thus the noise produced as a result of dropped bits is not prevented. Consequently, when playing back an audio signal sent from an external apparatus, improved playback quality is not guaranteed, even when the technology of the related art is used.

In light of the foregoing problems, it is desirable to provide a new and improved information processing apparatus, audio signal processing method, and program product enabling playback quality to be improved when playing back an audio signal sent from an external apparatus.

An information processing apparatus in accordance with an embodiment of the present invention includes: a communication unit configured to communicate with an external apparatus that splits outgoing audio data and sequentially sends transmission audio signals, each signal having a header corresponding to one of the split sets of audio data, as well as transmission audio data made up of one of the split sets of audio data with an appended first counter; an incoming data determining unit configured to determine the existence of continuity-related errors in a transmission audio signal received by the communication unit, the determination being made on the basis of the value of the first counter contained in the received transmission audio signal, as well as the value of a second counter identifying the transmission audio signal and contained in the header; and an audio processing command generator configured to selectively generate an audio processing command on the basis of the determination results in the incoming data determining unit, wherein the audio processing command stipulates audio data playback processing in the event of an error.

By means of such a configuration, it becomes possible to improve playback quality when playing back an audio signal sent from an external apparatus.

The incoming data determining unit may also relay determination results to the audio processing command generator indicating that a reception error occurred with respect to the transmission audio signal in the case where the bit length of the transmission audio data contained in the transmission audio signal currently being processed is less than the bit length of the outgoing audio data. The audio processing command generator may then generate an audio processing command corresponding to determination results indicating a reception error.

In the case where the bit length of the transmission audio data contained in a transmission audio signal currently being processed is equal to the bit length of the transmission audio data with the appended first counter in the external apparatus, the incoming data determining unit may use the value of the first counter contained in the transmission audio signal currently being processed as a basis for relaying to the audio processing command generator determination results indicating that a reception error occurred with respect to the audio data contained in the transmission audio signal. On the basis of determination results indicating a reception error with respect to the audio data, the audio processing command generator may then generate an audio processing command corresponding to determination results indicating a reception error with respect to the audio data.

In the case where the value of the second counter contained in a given transmission audio signal currently being processed is not consecutive with the value of the second counter contained in another transmission audio signal received subsequent to the given transmission audio signal, the incoming data determining unit may relay to the audio processing command generator a first determination result indicating that the received transmission audio signals are not consecutive. On the basis of the first determination result, the audio processing command generator may then generate an audio processing command corresponding to the first determination result.

In the case where the value of the second counter contained in a given transmission audio signal currently being processed is not consecutive with the value of the second counter contained in another transmission audio signal received immediately prior to the given transmission audio signal, the incoming data determining unit may relay to the audio processing command generator a second determination result indicating that the received transmission audio signals are not consecutive. On the basis of the second determination result, the audio processing command generator may then generate an audio processing command corresponding to the second determination result.

The information processing apparatus may also include a processor configured such that, on the basis of an audio processing command generated by the audio processing command generator, the processor selectively applies playback processing in accordance with the audio processing command to transmission audio data contained in the received transmission audio signal.

The processor may also split outgoing audio data to be sent to an external apparatus, and cause the communication unit to sequentially send transmission audio signals, each signal having a header containing the second counter corresponding to one of the split sets of audio data, as well as transmission audio data made up of one of the split sets of audio data with the appended first counter.

The processor may also split the audio data for each field of a picture signal to be sent synchronized with the outgoing audio data.

An audio signal processing method in accordance with another embodiment of the present invention includes the steps of: receiving a plurality of transmission audio signals sent from an external apparatus that splits outgoing audio data and sequentially sends transmission audio signals, each signal having a header corresponding to one of the split sets of audio data, as well as transmission audio data made up of one of the split sets of audio data with an appended first counter; determining the existence of continuity-related errors in a transmission audio signal received in the receiving step, the determination being made on the basis of the value of the first counter contained in the received transmission audio signal, as well as the value of a second counter identifying the transmission audio signal and contained in the header; selectively generating an audio processing command on the basis of the determination results in the determining step, wherein the audio processing command stipulates audio data playback processing in the event of an error; and on the basis of the audio processing command that was selectively generated in the generating step, selectively applying playback processing in accordance with the audio processing command to the received transmission audio signal.

By using such a method, it becomes possible to improve playback quality when playing back an audio signal sent from an external apparatus.

A program product in accordance with another embodiment of the present invention causes a computer to execute the steps of: receiving a plurality of transmission audio signals sent from an external apparatus that splits outgoing audio data and sequentially sends transmission audio signals, each signal having a header corresponding to one of the split sets of audio data, as well as transmission audio data made up of one of the split sets of audio data with an appended first counter; determining the existence of continuity-related errors in a transmission audio signal received in the receiving step, the determination being made on the basis of the value of the first counter contained in the received transmission audio signal, as well as the value of a second counter identifying the transmission audio signal and contained in the header; selectively generating an audio processing command on the basis of the determination results in the determining step, wherein the audio processing command stipulates audio data playback processing in the event of an error; and on the basis of the audio processing command that was selectively generated in the generating step, selectively applying playback processing in accordance with the audio processing command to the received transmission audio signal.

By using such a program product, it becomes possible to improve playback quality when playing back an audio signal sent from an external apparatus.

According to an embodiment of the present invention, it is possible to improve playback quality when playing back an audio signal sent from an external apparatus.

DESCRIPTION OF THE PREFERRED EMBODIMENTS

Preferred embodiments of the present invention will now be described in detail and with reference to the accompanying drawings. In both the specification and drawings herein, component elements having essentially identical functional configurations are given identical reference numbers, and repeated description of such elements is omitted.

Hereinafter, the description will proceed as follows.

1. Approach in accordance with an embodiment of the present invention
2. Information processing apparatus in accordance with an embodiment of the present invention
3. Program product in accordance with an embodiment of the present invention (Approach in Accordance with an Embodiment of the Present Invention)

Before describing an information processing apparatus in accordance with an embodiment of the present invention, an approach for improving the playback quality of an audio signal sent from an external apparatus in accordance with an embodiment of the present invention will be described.

Figure 1:
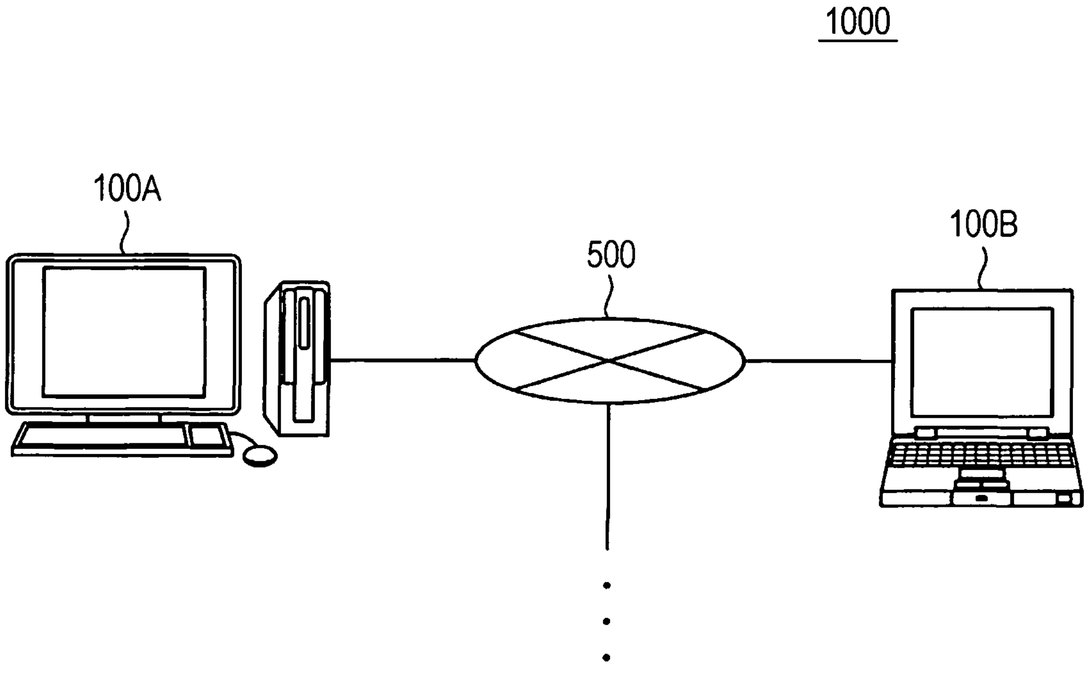
FIG. 1 is an explanatory diagram illustrating an overview of an information processing system in accordance with an embodiment of the present invention.
Figure 2:
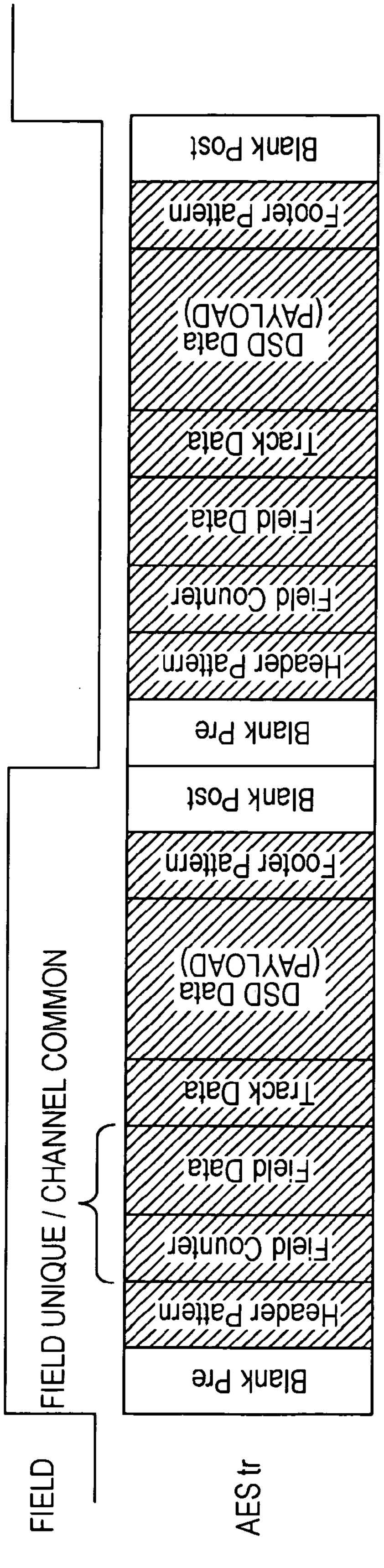
FIG. 2 is a diagram for explaining an exemplary transmission audio signal in accordance with an embodiment of the present invention.

FIG. 1 is an explanatory diagram illustrating an overview of an information processing system 1000 in accordance with an embodiment of the present invention. As shown in FIG. 1, the information processing system 1000 is provided with a plurality of information processing apparatus 100A, 100B, etc. (hereinafter, these apparatus may also be collectively referred to as the information processing apparatus 100). In addition, the respective information processing apparatus 100 are connected to each other via a network 500, for example. Although FIG. 1 shows the respective information processing apparatus 100 constituting the information processing system 1000 as being connected via the network 500, an embodiment of the present invention is not limited to the above. For example, each information processing apparatus 100 may also be directly connected to other information processing apparatus 100 by means of wired communication using a standard such as USB (Universal Serial Bus), or by means of wireless communication using a standard such as IEEE 802.11b, for example.

Herein, the network 500 may be a wired network such as a LAN (Local Area Network) or WAN (Wide Area Network), a wireless network via base stations such as a wireless WAN (WWAN; Wireless Wide Area Network) or wireless MAN (WMAN; Wireless Metropolitan Area Network), or an internet using a communication protocol such as TCP/IP (Transmission Control Protocol/Internet Protocol). However, the network 500 is not limited to the above.

Furthermore, a "connection" in accordance with an embodiment of the present invention herein refers to two or more information processing apparatus being in a state where communication is possible (or alternatively, the state where communication among such apparatus is possible), for example.

In the information processing apparatus 100, one of the information processing apparatus 100 (i.e., an external apparatus) sends an audio signal, while another information processing apparatus 100 receives the audio signal, processes the received audio signal, and outputs audio corresponding to the audio signal.

Hereinafter, the information processing apparatus 100 constituting the information processing system 1000 are described as processing audio signals by way of example. However, an information processing apparatus 100 in accordance with an embodiment of the present invention is not limited to the above. For example, in the information processing system 1000, an external apparatus may send a picture signal and an audio signal synchronized to each other, while an information processing apparatus 100 may process both the received picture signal and audio signal.

[Overview of Approach for Improving Playback Quality in Accordance with an Embodiment of the Present Invention]

By setting a counter in the header of an audio signal send from a transmitting information processing apparatus, it becomes possible for the receiving information processing apparatus to detect discontinuity in the audio signal. However, as described earlier, problems such as dropped bits in the audio data might not be detected, even if a counter is set in the header of the audio signal. In other words, even if a counter is set in the header of the audio signal, the receiving information processing apparatus might not be able to improve playback quality when playing back an audio signal sent from an external apparatus.

Thus, by respectively conducting processing like the following example between each transmitting information processing apparatus 100 and receiving information processing apparatus 100 in the information processing system 1000, it becomes possible to improve playback quality when playing back an audio signal sent from an external apparatus. Hereinafter, an information processing apparatus 100 that sends an audio signal in the information processing system 1000 may also be referred to as the sending apparatus. Likewise, an information processing apparatus 100 that receives and processes an audio signal in the information processing system 1000 may also be referred to as the receiving apparatus.

[Overview of Processing in the Sending Apparatus]

The sending apparatus splits up audio data to be sent, and generates transmission audio data wherein a first counter has been appended to the split audio data. Subsequently, the sending apparatus sequentially sends transmission audio signals (i.e., one transmission audio signal for each set of split audio data) containing the transmission audio data as well as a header that includes a second counter. Hereinafter, the act of appending the first counter may also be referred to as setting the first counter.

Herein, the sending apparatus may split the audio data for each field of a picture signal to be sent synchronized with the audio data to be sent, for example. However, an embodiment of the present invention is not limited to the above. For example, the sending apparatus may also split the audio data to be sent into particular bit lengths in accordance with factors such as the processing capability of the receiving apparatus (or stipulated in advance).

In the first counter in accordance with an embodiment of the present invention, a value for identifying the transmission audio data is recorded. Herein, the sending apparatus may set a first counter for each set of split audio data by expanding the bit length of each set of split audio data, and then allocating the expanded bit portion to a first counter for identifying the transmission audio data, for example. However, an embodiment of the present invention is not limited to the above. Alternatively, the sending apparatus may set a first counter in each set of transmission audio data, with the value of the first counter being incremented by 1 in the transmission order of the transmission audio signals, for example. However, an embodiment of the present invention is not limited to the above. The sending apparatus may also set a first counter whose value is incremented by a particular value in the transmission order of the transmission audio signals, for example. Hereinafter, a configuration will be described by way of example wherein the sending apparatus sets, in the transmission audio data, a first counter whose value is incremented by 1 in the transmission order of the transmission audio signals.

Meanwhile, in the second counter in accordance with an embodiment of the present invention, a value for identifying the transmission audio signal is recorded. Herein, the sending apparatus may include a second counter in the header of each transmission audio signal, wherein the value of the second counter is incremented by 1 in the transmission order of the transmission audio signals, for example. However, an embodiment of the present invention is not limited to the above. For example, the sending apparatus may also set a second counter whose value is incremented by a particular value in the transmission order of the transmission audio signals. Hereinafter, a configuration will be described by way of example wherein the sending apparatus includes, in the headers of the transmission audio signals, a second counter whose value is incremented by 1 in the transmission order of the transmission audio signals.

[Overview of Processing in the Receiving Apparatus]

The receiving apparatus receives transmission audio signals sent from the sending apparatus, and on the basis of the received transmission audio signals, determines whether or not continuity-related errors have occurred in the transmission audio signals, and if so, the types of errors involved. On the basis of the determination results, the receiving apparatus selectively conducts playback processing for the cases where an error occurred with respect to the transmission audio data (i.e., the payload) contained in the transmission audio signals, and then causes audio corresponding to the transmission audio data to be output. Herein, outputting audio corresponding to transmission audio data in accordance with an embodiment of the present invention refers to causing audio corresponding to transmission audio data to be output from an audio output device, such as one or more speakers, for example.

More specifically, the receiving apparatus detects problems in the transmission audio data (such as damaged transmission audio data) on the basis of the bit lengths of the transmission audio data in the received transmission audio signals. On the basis of the detection results, the receiving apparatus determines whether or not errors exist in the transmission audio signals, and if so, the types of errors involved. Additionally, on the basis of the values of the first and second counters set in the received transmission audio signals, the receiving apparatus detects discontinuity in the transmission audio signals and transmission audio data. On the basis of the detection results, the receiving apparatus determines whether or not continuity-related errors exist in the transmission audio signals, and if so, the types of errors involved.

As a result of the above determination, if it is determined that errors exist, then the receiving apparatus selectively generates an audio processing command in accordance with the determination results. The audio processing command stipulates how to process audio data for playback in the event of an error. The receiving apparatus then selectively conducts playback processing (i.e., the playback processing for use in the event of an error) corresponding to the generated audio processing command.

(Exemplary Playback Processing in the Receiving Apparatus in the Event of an Error)

(A) FIRST EXAMPLE

For example, if it is determined in the receiving apparatus that the bit length of the transmission audio data in a received transmission audio signal is less than the bit length of the audio data before the first counter was appended in the sending apparatus, then there is a high probability that the transmission audio data is damaged. Thus, playing back such damaged transmission audio data might lead to decreased playback quality due to factors such as unwanted noise, for example. Consequently, when a determination like the above is made (i.e., when it is determined that there was a reception error in the audio data), the receiving apparatus generates an audio processing command for muting the audio, for example, and plays back the transmission audio data in a muted state. In so doing, the receiving apparatus is able to prevent unwanted noise.

(B) SECOND EXAMPLE

As another example, if it is determined in the receiving apparatus that an error has occurred on the basis of the first counter contained in the transmission audio signal being processed, then there is a high probability that there are dropped bits in the transmission audio data. Thus, playing back such transmission audio data with dropped bits might lead to decreased playback quality due to factors such as unwanted noise, for example. Particularly, if the transmission audio data is digital audio data using 1-bit delta-sigma modulation, such as DSD data, for example, then dropped bits might lead to unacceptably low playback quality. Consequently, when a determination like the above is made (i.e., when it is determined that there was a reception error in the audio data), the receiving apparatus generates an audio processing command for muting the audio, for example, and plays back the transmission audio data in a muted state. In so doing, the receiving apparatus is able to prevent unwanted noise.

Herein, the receiving apparatus determines that an error based on the first counter has occurred when the value of the first counter contained in the transmission audio signal currently being processed is not consecutive with the value of the first counter contained in another transmission audio signal that was last received. However, an embodiment of the present invention is not limited to the above.

(C) THIRD EXAMPLE

As another example, if it is determined in the receiving apparatus that an error has occurred on the basis of the second counter contained in the transmission audio signal being processed, then there is a high probability that the received transmission audio signal was cut off during the communication process. Since the continuity of the audio to be played back is lost in this case, a user listening to such audio might perceive it as a type of noise, thus leading to decreased playback quality.

Herein, the receiving apparatus determines that an error based on the second counter has occurred when the value of the second counter contained in the transmission audio signal currently being processed is not consecutive with the value of the second counter contained in another transmission audio signal to be next received. (This is the first determination result.)

When the above first determination result is obtained, the receiving apparatus generates, for example, an audio processing command for fading out the transmission audio signal currently being processed, as well as an audio processing command for muting the transmission audio signal to be next received. In so doing, the receiving apparatus is able to prevent a type of noise that may occur due to discontinuity in playback audio.

In addition, the receiving apparatus determines that an error based on the second counter has occurred when the value of the second counter contained in the transmission audio signal currently being processed is not consecutive with the value of the second counter contained in another transmission audio signal that was last received. (This is the second determination result.)

When the above second determination result is obtained, the receiving apparatus generates, for example, an audio processing command for fading in the transmission audio signal currently being processed. In so doing, the receiving apparatus is able to prevent a type of noise that may occur due to discontinuity in playback audio.

The receiving apparatus generates an audio processing command according to determination results like the above, for example, and selectively conducts playback processing according to the audio processing command. Herein, it should be appreciated that the playback processing conducted according to an audio processing command in the receiving apparatus is not limited to the three examples given above.

As described above, on the basis of a received transmission audio signal, the receiving apparatus determines whether or not a continuity-related error has occurred in the transmission audio signal, and if so, the type of error involved. Subsequently, the receiving apparatus generates an audio processing command according to the error type, and selectively conducts playback processing according to the audio processing command. Herein, the receiving apparatus determines the existence and type of continuity-related errors on the basis of the bit length of the transmission audio data, the first counter set in the transmission audio data, and the second counter set in the header of the transmission audio signal. Consequently, as shown in the above three examples, the receiving apparatus is able to realize diverse playback processing (i.e., playback processing in the event of an error) according to the determined error type. Moreover, since the receiving apparatus is able to determine errors on the basis of a first counter set in the transmission audio data, the receiving apparatus is able to prevent noise, even when bits are dropped in the transmission audio data, for example.

Consequently, the receiving apparatus makes it possible to improve playback quality when playing back an audio signal sent from a sending apparatus (i.e., an external apparatus).

In the information processing system 1000, processing like the above is respectively conducted in both an information processing apparatus 100 that fulfills the role of a sending apparatus, and an information processing apparatus 100 that fulfills the role of a receiving apparatus. Consequently, an information processing system 1000 is realized that makes it possible to improve playback quality when playing back an audio signal sent from an external apparatus.

[Exemplary Transmission Audio Signals in Accordance with an Embodiment of the Present Invention]

Examples of transmission audio signals transferred in an information processing system 1000 in accordance with an embodiment of the present invention will now be described. Each of FIGS. 2 to 9F is a diagram for explaining an exemplary transmission audio signal in accordance with an embodiment of the present invention. Hereinafter, exemplary transmission audio signals are illustrated primarily for the case wherein one track of 60-bit, 64 fs DSD data is transmitted using a three-track band in 48 KHz/24-bit AES format. Additionally, the examples hereinafter are given for the case wherein a sending apparatus splits the audio signal to be sent at each field, and sends a transmission audio signal for each field. Herein, it should be appreciated that a transmission audio signal in accordance with an embodiment of the present invention is not limited to the examples shown in FIGS. 2 to 9F.

The transmission audio signal includes, for example, Blank Pre, Header Pattern, Field Counter, Field Data, Track Data, DSD Data (i.e., the payload), Footer Pattern, and Blank Post portions.

Herein, Blank Pre and Blank Post are portions where data is not written, being provided in order to avoid mixing with the processing of another transmission audio signal in the receiving apparatus, for example. Meanwhile, Header Pattern, Field Counter, Field Data, and Track Data are equivalent to a header.

Figure 3:
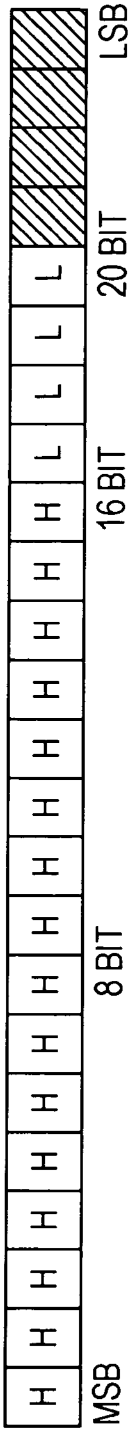
FIG. 3 is a diagram for explaining an exemplary transmission audio signal in accordance with an embodiment of the present invention.
Figure 4:
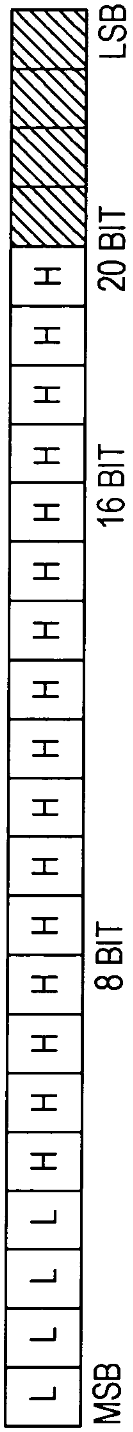
FIG. 4 is a diagram for explaining an exemplary transmission audio signal in accordance with an embodiment of the present invention.

FIG. 3 illustrates an example of a Header Pattern, while FIG. 4 illustrates a Footer Pattern. Using the Header Pattern, the receiving apparatus is able to determine the start of the portion of valid data to be processed in a single transmission audio signal, for example. Using the Footer Pattern, the receiving apparatus is able to determine the end of the portion of valid data to be processed in a single transmission audio signal, for example.

Figure 5:
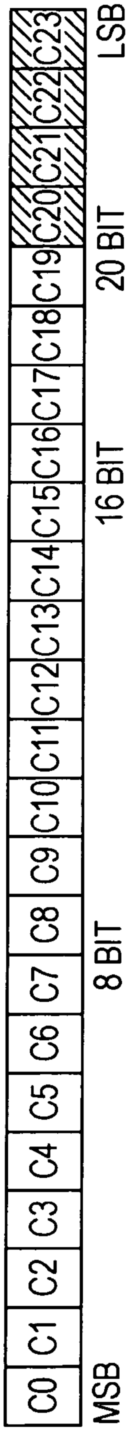
FIG. 5 is a diagram for explaining an exemplary transmission audio signal in accordance with an embodiment of the present invention.

FIG. 5 illustrates an example of a Field Counter. The Field Counter fulfills the role of the second counter, and in it a value for identifying the transmission audio signal is recorded. By means of the Field Counter, the receiving apparatus is able to determine discontinuity in a received transmission audio signal.

Figure 6A:
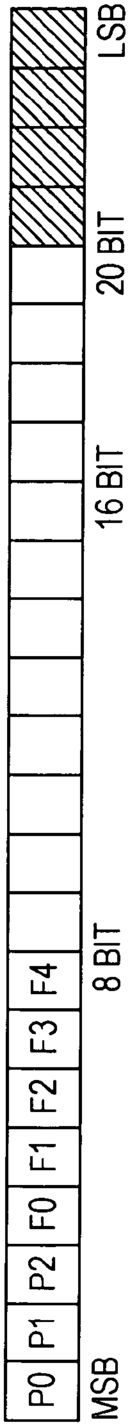
FIG. 6A is a diagram for explaining an exemplary transmission audio signal in accordance with an embodiment of the present invention.
Figure 6B:
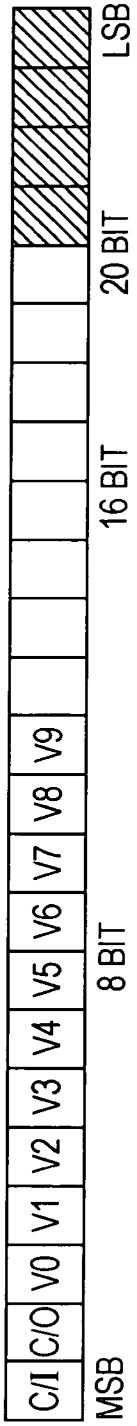
FIG. 6B is a diagram for explaining an exemplary transmission audio signal in accordance with an embodiment of the present invention.

FIGS. 6A and 6B illustrate an example of Field Data, herein shown as being made up of two samples. For example, in FIG. 6A, the portion from the MSB (Most Significant Bit) to bit 3 indicates the frame rate of the corresponding picture signal, while the portion from bit 4 to bit 8 indicates a field ID (FieldID) for identifying a field in the corresponding picture signal. Meanwhile, in FIG. 6B, the portion from the MSB to bit 2 indicates flags that respectively stipulate audio cut-in and cut-out, while the portion from bit 4 to bit 12 indicates the audio playback speed.

Figure 7:
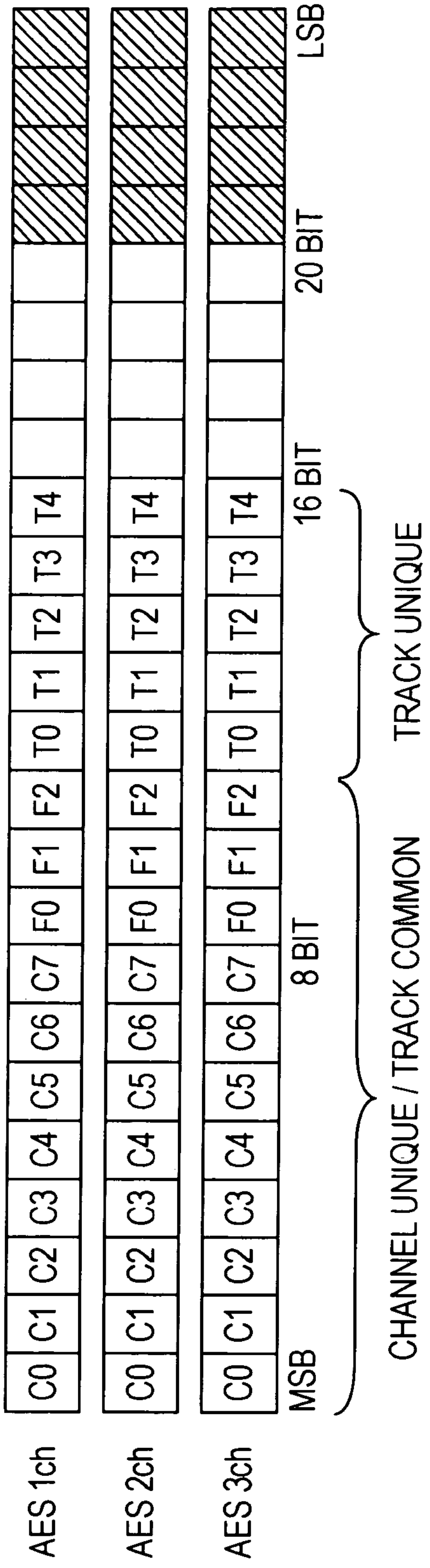
FIG. 7 is a diagram for explaining an exemplary transmission audio signal in accordance with an embodiment of the present invention.

FIG. 7 illustrates an example of Track Data, and in it data corresponding to three channels' worth of AES tracks is recorded. In FIG. 7, the portions from the MSB to bit 8 in each channel indicate the DSD channel ID (i.e., the input channel, or DSD ch ID), while the portions from bit 9 to bit 11 indicate the DSD fsID. In FIG. 7, the portions from bit 12 to bit 16 indicate the DSD track ID (i.e., the output track).

Figure 8:
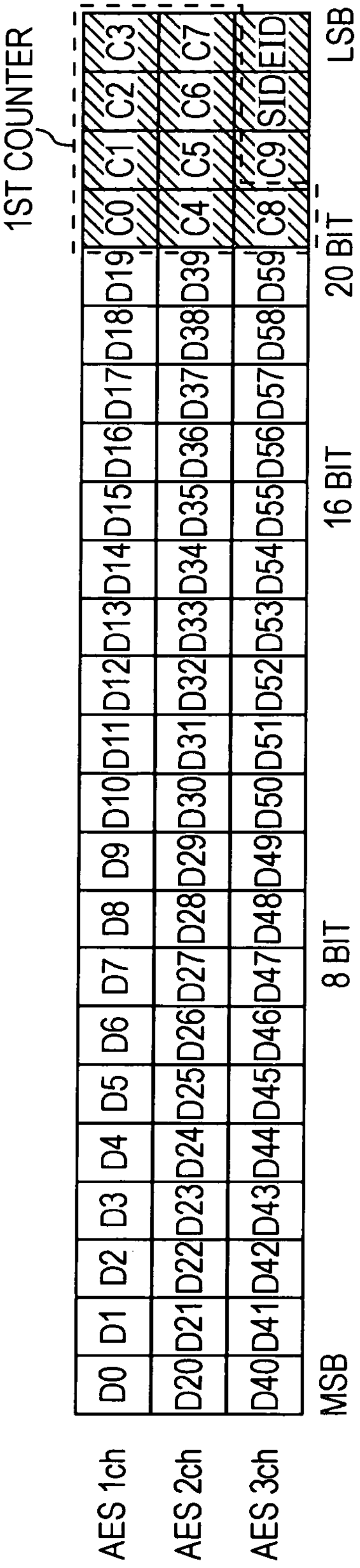
FIG. 8 is a diagram for explaining an exemplary transmission audio signal in accordance with an embodiment of the present invention.

FIG. 8 illustrates an example of DSD Data. In FIG. 8, 60-bit DSD data is allocated to each channel in 20-bit segments, with the first counter being allocated to a total of bits in the portions from bit 21 to the LSB (Least Significant Bit) in each channel. In FIG. 8, the portion from bit 23 to the LSB in the third AES channel indicates the start ID and end ID of the sample.

In a transmission audio signal in accordance with an embodiment of the present invention, a first counter like that shown by way of example in FIG. 8 is set. Consequently, by means of the DSD Data, the receiving apparatus is able to determine discontinuity in a received transmission audio signal (more specifically, in the transmission audio data contained in the transmission audio signal).

Figures 9A, 9B, 9C, 9D, 9E, 9F:
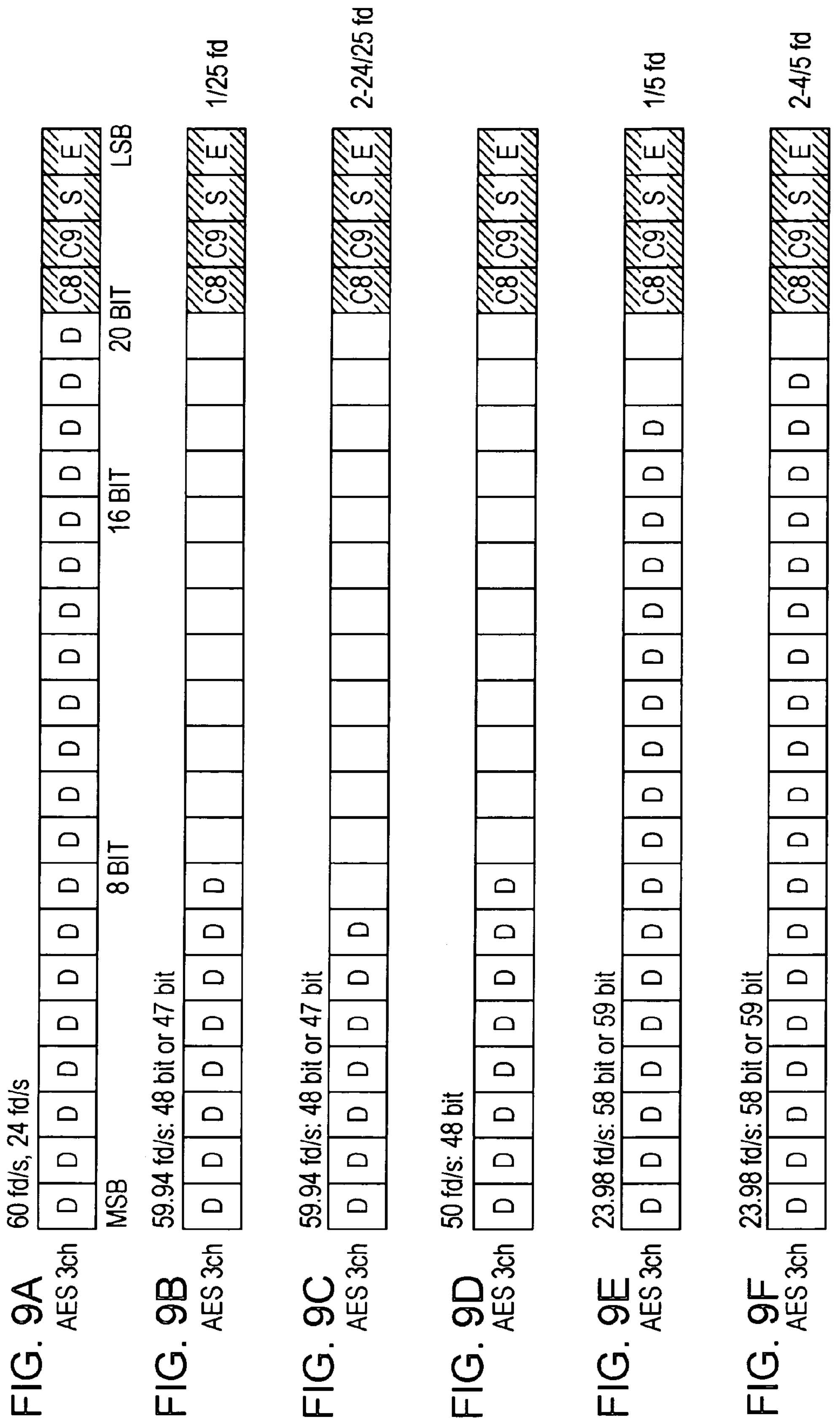
FIG. 9A is a diagram for explaining an exemplary transmission audio signal in accordance with an embodiment of the present invention.
FIG. 9B is a diagram for explaining an exemplary transmission audio signal in accordance with an embodiment of the present invention.
FIG. 9C is a diagram for explaining an exemplary transmission audio signal in accordance with an embodiment of the present invention.
FIG. 9D is a diagram for explaining an exemplary transmission audio signal in accordance with an embodiment of the present invention.
FIG. 9E is a diagram for explaining an exemplary transmission audio signal in accordance with an embodiment of the present invention.
FIG. 9F is a diagram for explaining an exemplary transmission audio signal in accordance with an embodiment of the present invention.

FIGS. 9A to 9F illustrate examples of DSD data other than 60-bit, 64 fs DSD data. For example, FIG. 9A illustrates an example of three AES channels at 60 fd/s and 24 fd/s. As shown in FIGS. 9A to 9F, even for DSD data other than 60-bit, 64 fs DSD data, the sending apparatus is still able to set a first counter similarly to that shown in FIG. 8.

In the information processing system 1000, a transmission audio signal like that shown by way of example in FIGS. 2 to 9F is send by a sending apparatus, and processed by a receiving apparatus.

[Specific Example of Processing Used in Approach in Accordance with an Embodiment of the Present Invention]

A specific example of processing used in an approach for improving the playback quality of an audio signal in accordance with an embodiment of the present invention will now be described. The processing herein is executed in the information processing apparatus 100 constituting an information processing system 1000. Hereinafter, a process executed in the information processing apparatus 100 that fulfills the role of sending apparatus, and a process executed in the information processing apparatus 100 that fulfills the role of receiving apparatus, will be respectively described. In addition, the example hereinafter describes the case wherein the sending apparatus sends a transmission audio signal synchronized with a picture signal, as shown by way of example in FIGS. 2 to 8.

Furthermore, the example hereinafter describes the case wherein the sending apparatus converts the audio signal to be sent from a first audio signal in accordance with a first transmission standard to a second audio signal in accordance with a second transmission standard. Meanwhile, the receiving apparatus converts the received second audio signal into the first audio signal. Herein, the first transmission standard is taken to be SDIF-3 (Sony Digital Interface Format 3) by way of example, while the second transmission standard is taken to be AES/EBU by way of example, but neither transmission standard is limited to the above. It should also be appreciated that, in the information processing system 1000 in accordance with an embodiment of the present invention, both the sending apparatus and the receiving apparatus are respectively able to send and receive an audio signal without converting the audio signal.

(Exemplary Process in Sending Apparatus)

Figure 10:
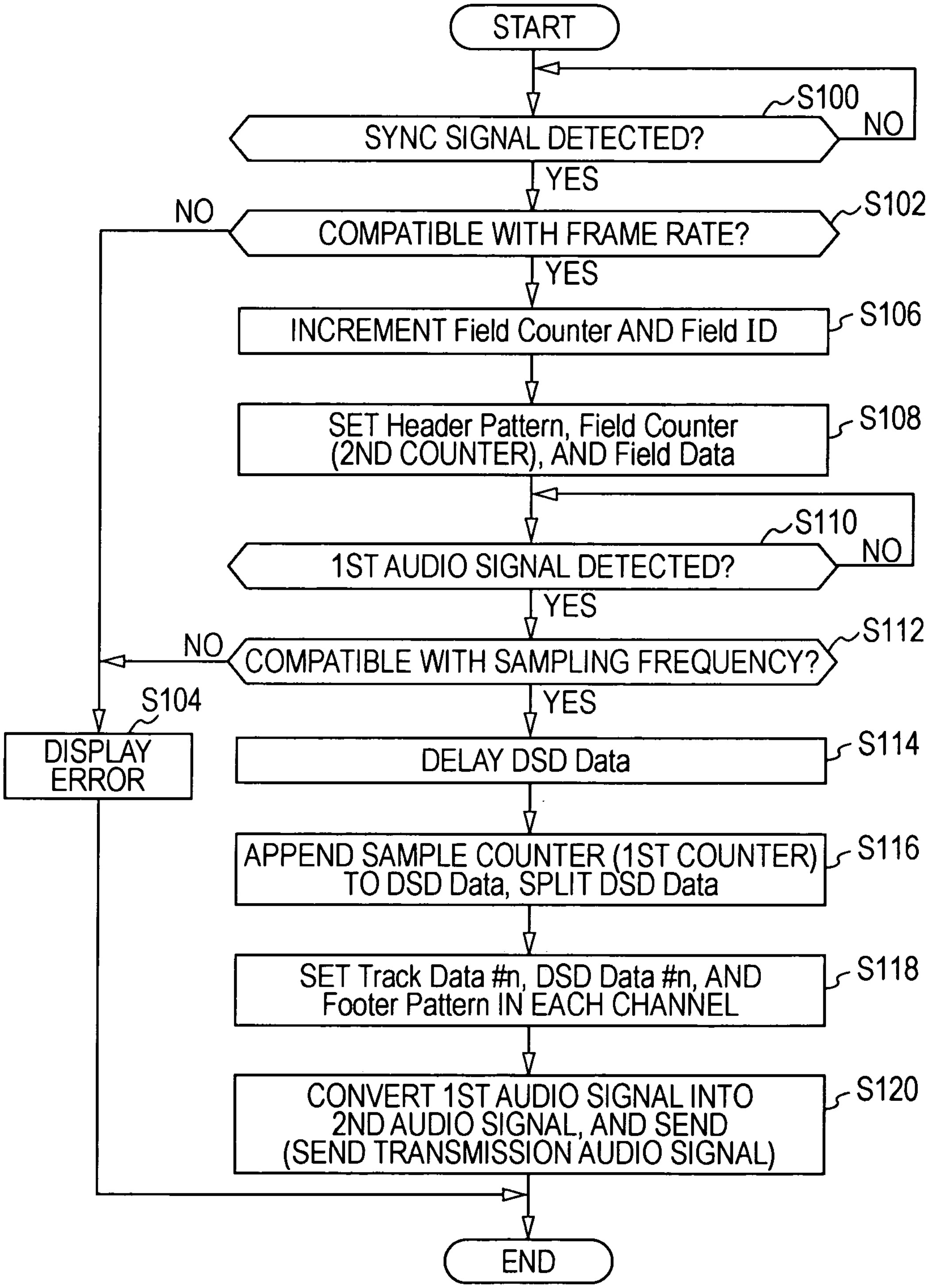
FIG. 10 is a flowchart illustrating an exemplary process in an information processing apparatus that fulfills the role of a sending apparatus in accordance with an embodiment of the present invention.

FIG. 10 is a flowchart illustrating an exemplary process in an information processing apparatus 100 that fulfills the role of sending apparatus in accordance with an embodiment of the present invention. Herein, the process shown in FIG. 10 is not a type of process that is completed in one iteration, but is instead repeatedly executed until the audio signal for transmission has been completely sent, for example.

On the basis of a picture signal to be sent, the sending apparatus determines whether or not a sync signal (such as a SD (Standard Definition) or HD (High Definition) sync signal) has been detected (S100). If a sync signal is not detected in step S100, then the sending apparatus does not advance the process.

If a sync signal is detected in step S100, then the sending apparatus determines whether or not the frame rate is compatible, on the basis of the picture signal (S102). At this point, the sending apparatus may make the determination in step S102 by comparing the frame rate indicated by the picture signal to information indicating compatible frame rates that is stored in a storage unit (to be hereinafter described) provided in the sending apparatus, for example. However, an embodiment of the present invention is not limited to the above.

If it is not determined in step S102 that the frame rate is compatible, then the sending apparatus may, for example, present the user of the sending apparatus with an error indicating that processing is unavailable because the frame rate is incompatible (S104). Herein, the sending apparatus may present errors to the user by visual means such as text, or by auditory means such as sounds. However, an embodiment of the present invention is not limited to the above.

If it is determined in step S102 that the frame rate is compatible, then the sending apparatus increments the value of the Field Counter and the value of the FIELD ID (S106). Subsequently, on the basis of information such as the values set in step S106, the sending apparatus sets the Header Pattern, Field Counter, and Field Data as shown by way of example in FIGS. 3, 5, 6A, and 6B (S108).

The sending apparatus determines whether or not the first audio signal has been detected (S110). If it is not determined in step S110 that the first audio signal has been detected, then the sending apparatus does not advance the process. Herein, FIG. 10 illustrates the example of the sending apparatus conducting the processing in step S110 after step S108, but an embodiment of the present invention is not limited to the above. For example, after having determined in step S102 that the frame rate is compatible, the sending apparatus may also conduct the processing in steps S106 and S108 independently of the processing in step S110.

Meanwhile, if it is determined in step S110 that the first audio signal has been detected, then the sending apparatus uses the first audio signal as a basis for determining whether or not the sampling frequency is compatible (S112). At this point, the sending apparatus may make the determination in step S112 by comparing the sampling frequency indicated by the first audio signal to information indicating compatible sampling frequencies that is stored in a storage unit (to be hereinafter described) provided in the sending apparatus, for example. However, an embodiment of the present invention is not limited to the above.

If it is not determined in step S112 that the sampling frequency is compatible, then the sending apparatus may, for example, present the user of the sending apparatus with an error indicating that processing is unavailable because the sampling frequency is incompatible (S104).

Meanwhile, if it is determined in step S112 that the sampling frequency is compatible, then the sending apparatus delays the DSD Data contained in the first audio signal (S114). Subsequently, the sending apparatus appends a sample counter (i.e., the first counter) to the DSD Data, and splits the DSD Data with the appended sample counter into a number of portions equal to the number of channels (S116).

For each channel, the sending apparatus sets Track Data, DSD Data, and a Footer Pattern like that shown by way of example in FIGS. 4, 7, and 8 (step S118). Herein, "#n" shown in step S118 of FIG. 10 represents the channel number (where n is a positive integer).

Upon completion of the various settings for each channel in step S118, the sending apparatus converts the first audio signal into the second audio signal, and sends the second audio signal to a destination receiving apparatus (S120; send transmission audio signal).

By executing the process shown by way of example in FIG. 10, the sending apparatus is able to send, for each field, a transmission audio signal having a first counter and a second counter set therein. However, it should be appreciated that the process executed in a information processing apparatus 100 that fulfills the role of sending apparatus in accordance with an embodiment of the present invention is not limited to the process shown in FIG. 10.

(Exemplary Process in Receiving Apparatus)

Figure 11:
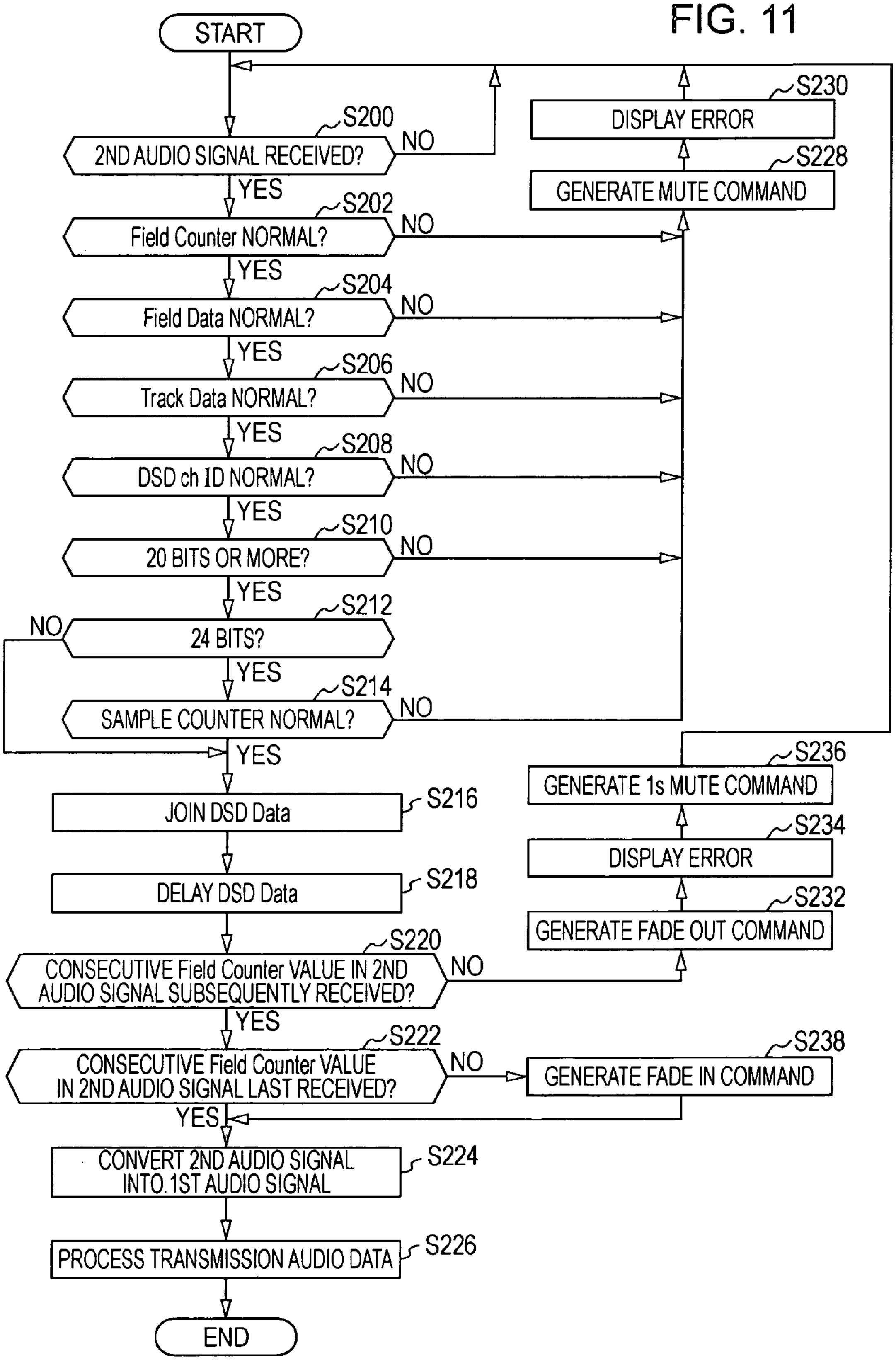
FIG. 11 is a flowchart illustrating an exemplary process in an information processing apparatus that fulfills the role of a receiving apparatus in accordance with an embodiment of the present invention.

FIG. 11 is a flowchart illustrating an exemplary process in an information processing apparatus 100 that fulfills the role of receiving apparatus in accordance with an embodiment of the present invention. Herein, the process shown in FIG. 11 is not a type of process that is completed in one iteration, but is instead repeated each time a transmission audio signal is received.

The sending apparatus determines whether or not a second audio signal (herein equivalent to a transmission audio signal) has been received (S200). If it is not determined in step S200 that a second audio signal has been received, then the process halts, and the receiving apparatus does not advance the process until it is determined that a second audio signal has been received. Herein, the receiving apparatus may receive a second audio signal on each channel, for example.

Meanwhile, if it is determined in step S200 that a second audio signal has been received, then the receiving apparatus determines whether or not the Field Counter (i.e., the second counter) is normal (S202). Herein, the receiving apparatus may make the determination in step S202 by comparing Field Counter values across respective channels, for example. However, an embodiment of the present invention is not limited to the above.

If it is not determined in step S202 that the Field Counter is normal, then the receiving apparatus generates a mute command (herein being one example of an audio processing command) (S228). In addition, the receiving apparatus may also, for example, present the user of the receiving apparatus with an error indicating that an error occurred in the receiving of the transmission audio signal (S230). Subsequently, the receiving apparatus repeats the process starting from step S200. Herein, the receiving apparatus may present errors to the user by visual means such as text, or by auditory means such as sounds. However, an embodiment of the present invention is not limited to the above. Furthermore, although not shown in FIG. 11, the receiving apparatus may, on the basis of the mute command generated in step S228, cause the transmission audio data to be played back in a muted state, for example.

Meanwhile, if it is determined in step S202 that the Field Counter is normal, then the receiving apparatus next determines whether or not the Field Data is normal (S204). Herein, the receiving apparatus may make the determination in step S204 by comparing the Field Data across respective channels, for example. However, an embodiment of the present invention is not limited to the above.

If it is not determined in S204 that the Field Data is normal, then the receiving apparatus generates a mute command (herein being one example of an audio processing command) (S228). In addition, the receiving apparatus may also, for example, present the user of the receiving apparatus with an error indicating that an error occurred in the receiving of the transmission audio signal (S230). Subsequently, the receiving apparatus repeats the process starting from step S200.

Meanwhile, if it is determined in step S204 that the Field Data is normal, then the receiving apparatus next determines whether or not the Track Data is normal (S206).

If it is not determined in S206 that the Track Data is normal, then the receiving apparatus generates a mute command (herein being one example of an audio processing command) (S228). In addition, the receiving apparatus may also, for example, present the user of the receiving apparatus with an error indicating that an error occurred in the receiving of the transmission audio signal (S230). Subsequently, the receiving apparatus repeats the process starting from step S200.

Meanwhile, if it is determined in step S206 that the Track Data is normal, then the receiving apparatus next determines whether or not the DSD ch ID (i.e., the DSD channel ID) is normal (S208).

If it is not determined in S208 that the DSD ch ID is normal, then the receiving apparatus generates a mute command (herein being one example of an audio processing command) (S228). In addition, the receiving apparatus may also, for example, present the user of the receiving apparatus with an error indicating that an error occurred in the receiving of the transmission audio signal (S230). Subsequently, the receiving apparatus repeats the process starting from step S200.

Meanwhile, if it is determined in step S208 that the DSD ch ID is normal, then the receiving apparatus determines whether or not the bit length of the DSD Data is 20 bits or more (S210). In step S210 of FIG. 11 herein, the receiving apparatus makes a determination using 20 bits as the criterion. However, this criterion is for describing the example of 60-bit DSD data being split into 20-bit portions, as shown in FIG. 8. In other words, an information processing apparatus 100 fulfilling the role of receiving apparatus in accordance with an embodiment of the present invention is not limited to using a criterion of 20 bits in step S210, and may use a bit length for the criterion that is based on the audio data before the first counter is appended, for example.

If it is not determined in step S210 that the bit length of the DSD Data is 20 bits or more, then the receiving apparatus generates a mute command (herein being one example of an audio processing command) (S228). In addition, the receiving apparatus may also, for example, present the user of the receiving apparatus with an error indicating that an error occurred in the receiving of the transmission audio signal (S230). Subsequently, the receiving apparatus repeats the process starting from step S200. The above processing is equivalent to the first example of playback processing in the event of an error in the receiving apparatus.

Meanwhile, if it is determined in step S210 that the bit length of the DSD Data is 20 bits or more, then the receiving apparatus next determines whether or not the bit length of the DSD Data is 24 bits (S212). In step S212 of FIG. 11 herein, the receiving apparatus makes a determination using 24 bits as the criterion. However, this criterion is for describing the example of the DSD Data shown in FIG. 8. In other words, an information processing apparatus 100 fulfilling the role of receiving apparatus in accordance with an embodiment of the present invention is not limited to using a criterion of 24 bits in step S212.

If it is not determined in step S212 that the bit length of the DSD Data is 24 bits, then the receiving apparatus conducts the processing in step S216, to be hereinafter described.

Meanwhile, if it is determined in step S212 that the bit length of the DSD Data is 24 bits, then the receiving apparatus next determines whether or not the sample counter (i.e., the first counter) is normal (S214). Herein, the receiving apparatus may determine that the sample counter is not normal when, for example, the value of the first counter contained in the second audio signal currently being processed (herein equivalent to the transmission audio signal) is not consecutive with the value of the first counter contained in another second audio signal that was last received. However, an embodiment of the present invention is not limited to the above.

If it is not determined in step S214 that the sample counter (i.e., the first counter) is normal, then the receiving apparatus generates a mute command (herein being one example of an audio processing command) (S228). In addition, the receiving apparatus may also, for example, present the user of the receiving apparatus with an error indicating that an error occurred in the receiving of the transmission audio signal (S230). Subsequently, the receiving apparatus repeats the process starting from step S200. The above processing is equivalent to the second example of playback processing in the event of an error in the receiving apparatus.

Meanwhile, if it is determined in step S214 that the sample counter (i.e., the first counter) is normal, then the receiving apparatus joins the DSD Data from the respective channels (S216). Subsequently, the receiving apparatus delays the joined DSD Data (S218).

The receiving apparatus then determines whether or not the value of the Field Counter (i.e., the second counter) in another second audio signal to be next received is consecutive with the value of the Field Counter in the second audio signal currently being processed (S220).

If it is not determined in step S220 that the value of the Field Counter (i.e., the second counter) in another second audio signal to be next received is consecutive, then the receiving apparatus generates a fade out command (herein being one example of an audio processing command) (S232). In addition, the receiving apparatus presents the user of the receiving apparatus with an error indicating that, for example, an error occurred in the receiving of the transmission audio signal (S234), while also generating a is mute command (herein being one example of an audio processing command) (S236). Subsequently, the receiving apparatus repeats the process starting from step S200. The above processing is equivalent to the third example of playback processing in the event of an error in the receiving apparatus. Although not shown in FIG. 11, on the basis of the various audio processing commands generated in steps S232 and S236, the receiving apparatus may also play back the transmission audio data in a state according to the audio processing commands, for example.

Meanwhile, if it is determined in step S220 that the value of the Field Counter (i.e., the second counter) is consecutive, then the receiving apparatus next determines whether or not the value of the Field Counter contained in another transmission audio signal that was last received is consecutive with the value of the Field Counter in the second audio signal currently being processed (S222).

If it is not determined in step S222 that the value of the Field Counter (i.e., the second counter) in another second audio signal that was last received is consecutive, then the receiving apparatus generates a fade in command (herein being one example of an audio processing command) (S238). The above processing is equivalent to the third example of playback processing in the event of an error in the receiving apparatus. Subsequently, the receiving apparatus conducts the processing in step S224, to be hereinafter described.

Meanwhile, if it is determined in step S222 that the value of the Field Counter (i.e., the second counter) is consecutive, then the receiving apparatus converts the second audio signal into the first audio signal (S224), and then processes the transmission audio data (S226). By means of the processing in step S226, audio corresponding to the transmission audio data that was sent from the sending apparatus is output from an audio output device, such as one or more speakers.

By conducting the process shown by way of example in FIG. 11, the receiving apparatus is able to use a transmission audio signal sent from the sending apparatus as a basis for determining whether or not continuity-related errors exist in the transmission audio signal, and if so, the types of errors involved. Furthermore, by conducting the process shown by way of example in FIG. 11, the receiving apparatus is able to generate audio processing commands according to error type, and selectively conduct playback processing according to the audio processing commands. Consequently, by conducting the process shown by way of example in FIG. 11, the receiving apparatus makes it possible to improve playback quality when playing back an audio signal sent from the sending apparatus (i.e., an external apparatus). It should be appreciated that the process conducted in an information processing apparatus 100 fulfilling the role of a receiving apparatus in accordance with an embodiment of the present invention is not limited to the process shown in FIG. 11.

(Information Processing Apparatus in Accordance with an Embodiment of the Present Invention)

An exemplary configuration of an information processing apparatus 100 in accordance with an embodiment of the present invention will now be described. Such an information processing apparatus 100 is able to realize the above-described approach for improving the playback quality of an audio signal sent from an external apparatus in accordance with an embodiment of the present invention.

Hereinafter, an exemplary configuration will be described for an information processing apparatus capable of fulfilling both the role of sending apparatus as well as the role of a receiving apparatus. It should also be appreciated that an information processing apparatus in accordance with an embodiment of the present invention may be configured to fulfill the role of either a sending apparatus or a receiving apparatus.

Figure 12:
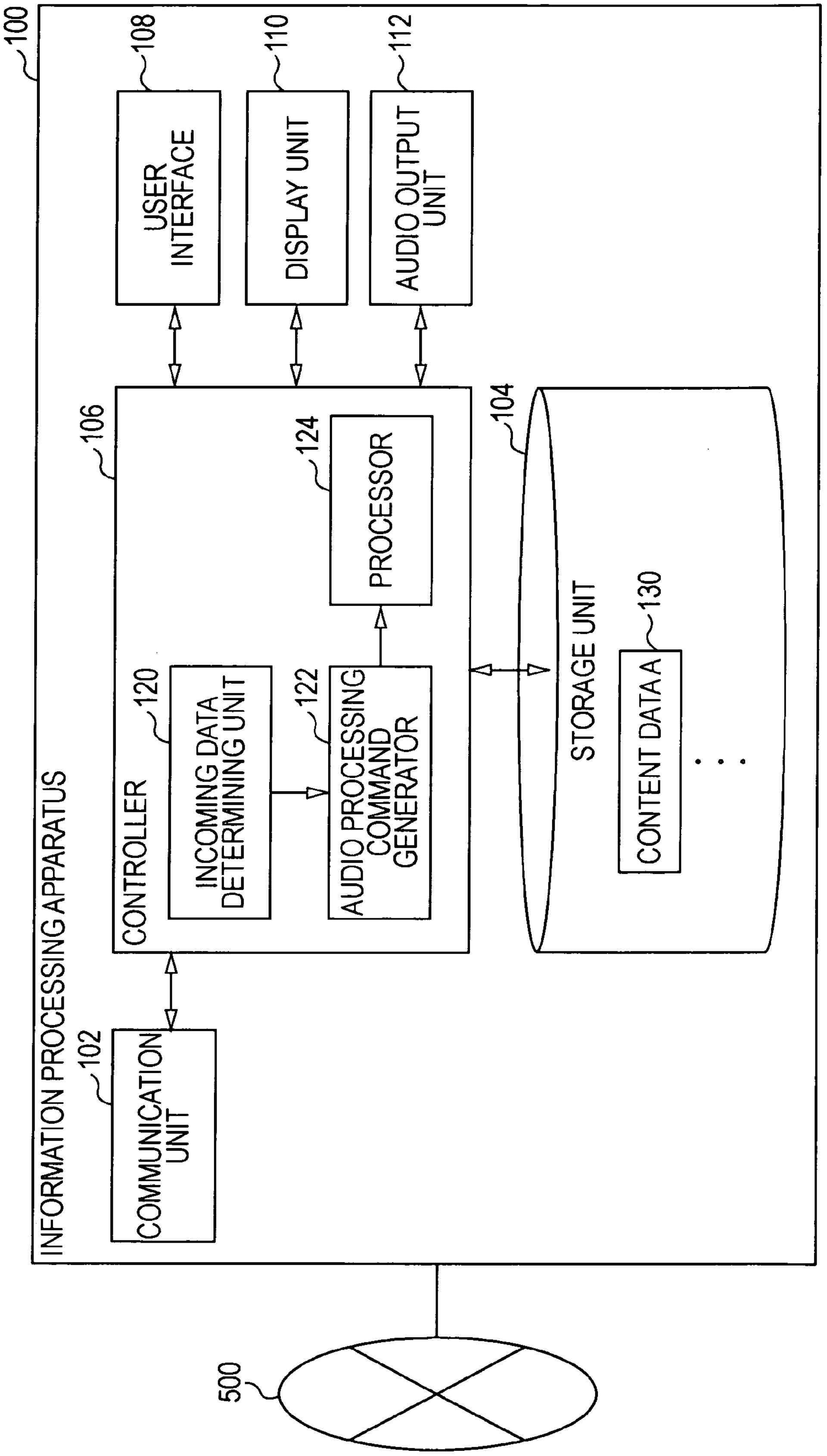
FIG. 12 is an explanatory diagram illustrating an exemplary configuration of an information processing apparatus in accordance with an embodiment of the present invention.

FIG. 12 is an explanatory diagram illustrating an exemplary configuration of an information processing apparatus 100 in accordance with an embodiment of the present invention. The information processing apparatus 100 is provided with a communication unit 102, a storage unit 104, a controller 106, a user interface 108, a display unit 110, and an audio output unit 112.

The information processing apparatus 100 may also be provided with, for example, ROM (Read-Only Memory; not shown) and RAM (Random Access Memory; not shown). The various component elements of the information processing apparatus 100 may be connected by a bus, for example, which acts as a data transfer pathway. Herein, the ROM (not shown) stores programs used by the controller 106, as well as control data, such as computational parameters. The RAM (not shown) temporarily stores information such as programs executed by the controller 106.

(Exemplary Hardware Configuration of Information Processing Apparatus 100)

Figure 13:
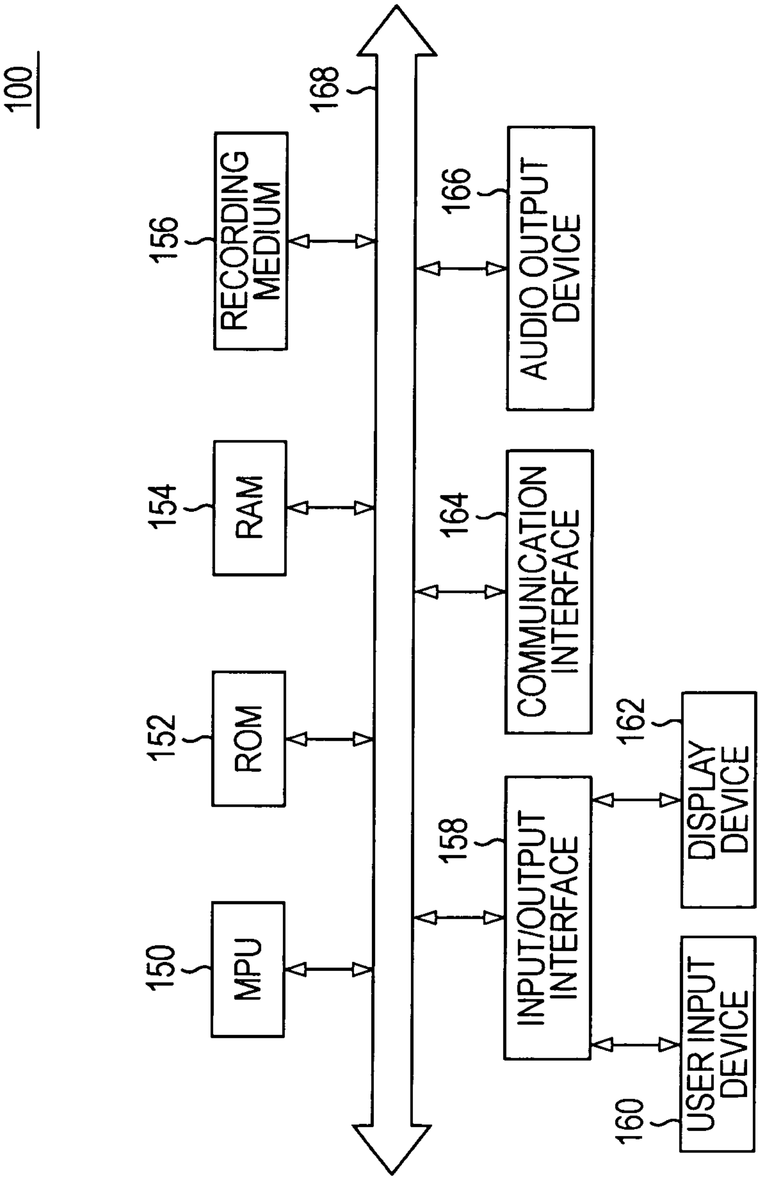
FIG. 13 is an explanatory diagram illustrating an exemplary hardware configuration of an information processing apparatus in accordance with an embodiment of the present invention.

FIG. 13 is an explanatory diagram illustrating an exemplary hardware configuration of an information processing apparatus 100 in accordance with an embodiment of the present invention. Referring to FIG. 13, the information processing apparatus 100 is provided with, for example, an MPU 150, ROM 152, RAM 154, a recording medium 156, an input/output interface 158, a user input device 160, a display device 162, a communication interface 164, and an audio output device 166. In addition, the various component elements of the information processing apparatus 100 may be connected by a bus 168, for example, which acts as a data transfer pathway.

The MPU 150 is an integrated circuit integrating a plurality of circuit for realizing control functions, such as an MPU (Micro Processing Unit) and DSP (Digital Signal Processor). The MPU 150 functions as the controller 106 the controls overall operation of the information processing apparatus 100. In addition, in the information processing apparatus 100, the MPU 150 is also able to fulfill the roles of an incoming data determining unit 120, an audio processing command generator 122, and a processor 124, to be hereinafter described.

The ROM 152 stores programs used by the MPU 150, as well as control data, such as computational parameters. The RAM 154 temporarily stores information such as programs executed by the MPU 150, for example.

The recording medium 156 functions as the storage unit 104 and stores various data, including information (data) used for processing (such as the information indicating compatible frame rates that was described earlier), content data, and applications. The recording medium 156 herein may be, for example, a magnetic recording medium, such as a hard disk, or non-volatile memory, such as EEPROM (Electrically Erasable and Programmable Read-Only Memory), flash memory, MRAM (Magnetoresistive Random Access Memory), FeRAM (Ferroelectric Random Access Memory), or PRAM (Phase change Random Access Memory). However, an embodiment of the present invention is not limited to the above.

The input/output interface 158 is connected to components such as the user input device 160 and the display device 162. The user input device 160 functions as the user interface 108, while the display device 162 functions as the display unit 110. The input/output interface 158 herein may be one of various processing circuits, such as a USB port, DVI (Digital Visual Interface) port, or HDMI (High Definition Multimedia Interface) port. However, an embodiment of the present invention is not limited to the above. In addition, the user input device 160 may be provided on the information processing apparatus 100, for example, and connected to the input/output interface 158 internally in the information processing apparatus 100. The user input device 160 may include, for example, buttons, directional keys, rotary selectors such as a jog dial, or a combination of such elements. However, an embodiment of the present invention is not limited to the above. Additionally, the display device 162 may be provided on the information processing apparatus 100, for example, and connected to the input/output interface 158 internally in the information processing apparatus 100. The display device 162 may be, for example, an LCD (Liquid Crystal Display), or an organic EL display (organic ElectroLuminescence display, also referred to as an OLED (Organic Light Emitting Diode) display). However, an embodiment of the present invention is not limited to the above. It should also be appreciated that the input/output interface 158 may also be able to connect apparatus that are external to the information processing apparatus 100, including user input devices (such as a keyboard and mouse) as well as display devices (such as an external display).

The communication interface 164 is a communication means provided in the information processing apparatus 100, and functions as the communication unit 102 for communicating in a wired or wireless manner with an external apparatus via the network 500 (or directly). The communication interface 164 herein may be, for example, a communication antenna and RF circuit (for wireless communication), an IEEE 802.15.1 port and transceiver circuit (for wireless communication), an IEEE 802.11b port and transceiver circuit (for wireless communication), or a LAN port and transceiver circuit (for wired communication). However, an embodiment of the present invention is not limited to the above.

The audio output device 166 may include components such as an amp and one or more speakers, and outputs audio corresponding to the audio data processed by the MPU 150.

By means of the configuration shown by way of example in FIG. 13, the information processing apparatus 100 realizes processes (such as the processes shown by way of example in FIGS. 10 and 11) in accordance with the above-described approach for improving the playback quality of an audio signal in accordance with an embodiment of the present invention. It should be appreciated that the hardware configuration of an information processing apparatus 100 in accordance with an embodiment of the present invention is not limited to the configuration shown in FIG. 13. For example, the information processing apparatus 100 may be further provided with an external recording medium for recording content data thereon, the recording medium being realized in the form of an optical disc drive (not shown) able to read out data from an optical disc.

Referring again to FIG. 12, the component elements of the information processing apparatus 100 will now be described. The communication unit 102 is a communication means provided in the information processing apparatus 100, and communicates in a wired or wireless manner with an external apparatus via the network 500 (or directly). By providing the communication unit 102, the information processing apparatus 100 is able to receive transmission audio signals and picture signals from an external apparatus (such as another information processing apparatus 100 fulfilling the role of a sending apparatus). Additionally, the communication with an external apparatus that is conducted by the communication unit 102 may also be controlled by the controller 106, for example.

The communication unit 102 herein may be, for example, a communication antenna and RF circuit (for wireless communication), an IEEE 802.15.1 port and transceiver circuit (for wireless communication), an IEEE 802.11b port and transceiver circuit (for wireless communication), or a LAN port and transceiver circuit (for wired communication). However, an embodiment of the present invention is not limited to the above.

The storage unit 104 is a storage means provided in the information processing apparatus 100. The storage unit 104 herein may be, for example, a magnetic recording medium such as a hard disk, or non-volatile memory such as flash memory. However, an embodiment of the present invention is not limited to the above.

The storage unit 104 stores a variety of data, including information (data) used for processing (such as the information indicating compatible frame rates that was described earlier), content data, and applications. Herein, FIG. 12 illustrates the example of content data A 130 being stored in the storage unit 104, but an embodiment of the present invention is not limited to the above. Furthermore, content data in accordance with an embodiment of the present invention may be, for example, image data expressing still or video images, and/or audio data. However, an embodiment of the present invention is not limited to the above. For example, content data in accordance with an embodiment of the present invention may also include metadata recording a variety of information.

On the basis of content data stored in the storage unit 104, for example, the information processing apparatus 100 is able to send (i.e., transmit) picture signals and/or audio signals to an external apparatus.

The controller 106 is an integrated circuit integrating various processing circuits such as an MPU and DSP, and fulfills the role of controlling overall operation of the information processing apparatus 100. In addition, the controller 106 is provided with an incoming data determining unit 120, an audio processing command generator 122, and a processor 124, and fulfills the role of guiding processes in accordance with the above-described approach for improving the playback quality of an audio signal in accordance with an embodiment of the present invention.

On the basis of a transmission audio signal received by the communication unit 102, the incoming data determining unit 120 determines whether or not continuity-related errors exist in the transmission audio signal, and if so, the types of errors involved. More specifically, the incoming data determining unit 120 determines the existence and types of continuity-related errors in the transmission audio signal on the basis of the first counter, the second counter, and the bit length of the transmission audio data contained in the received transmission audio signal.

In addition, the incoming data determining unit 120 relays the determination results to the audio processing command generator 122. Herein, the incoming data determining unit 120 relays determination results to the audio processing command generator 122 when it is determined that an error has occurred, but an embodiment of the present invention is not limited to the above. For example, the incoming data determining unit 120 may also relay determination results to the audio processing command generator 122 each time a determination is made.

If a continuity-related error is determined by the incoming data determining unit 120 to exist in the transmission audio signal, then on the basis of the determination results relayed from the incoming data determining unit 120, the audio processing command generator 122 selectively generates audio processing commands according to the error type. Herein, the audio processing commands generated by the audio processing command generator 122 include mute commands, fade out commands, and fade in commands, for example. However, an embodiment of the present invention is not limited to the above. Furthermore, the audio processing command generator 122 may generate audio processing commands according to error type as shown by the first to third playback processing examples described earlier, for example.

In addition, the audio processing command generator 122 relays the generated audio processing commands to the processor 124.

The processor 124 processes the transmission audio data contained in transmission audio signals received by the communication unit 102, and causes audio based on the transmission audio data to be output from the audio output unit 112. Furthermore, the processor 124 is also able to process picture signals received by the communication unit 102, and cause pictures (i.e., video or still images) based on the picture signals to be displayed by the display unit 110.

In addition, on the basis of an audio processing command relayed from the audio processing command generator 122, the processor 124 processes the transmission audio data contained in the transmission audio signal received by the communication unit 102 by selectively conducting playback processing (i.e., playback processing in the event of an error) according to the audio processing command.

By providing the controller 106 with the incoming data determining unit 120, the audio processing command generator 122, and the processor 124, the information processing apparatus 100 is able to fulfill the role of receiving apparatus.

Furthermore, the processor 124 also includes functions for taking transmission audio signals based on content data stored in the storage unit 104, for example, and causing such transmission audio signals to be sequentially sent from the communication unit 102 to a destination external apparatus (i.e., another information processing apparatus 100 fulfilling the role of receiving apparatus).

More specifically, the processor 124 splits the audio data constituting the content data to be sent, and respectively appends a first counter to each set of audio data resulting from the split. Each transmission audio signal thus contains transmission audio data (i.e., a payload) with an appended first counter, as well as a header containing a second counter. Subsequently, the processor 124 causes the communication unit 102 to sequentially send the above transmission audio signals, synchronized with individual fields of a picture signal to be sent, for example.

By including the above functions for sending transmission audio signals in the processor 124, the information processing apparatus 100 is able to fulfill the role of sending apparatus.

The controller 106 is thus provided with an incoming data determining unit 120, an audio processing command generator 122, and an processor 124, as described above. Consequently, the controller 106 is able to fulfill the role of guiding processes in accordance with the above-described approach for improving the playback quality of an audio signal in accordance with an embodiment of the present invention.

The user interface 108 is a user interface means provided in the information processing apparatus 100 that enables user operations to be performed by the user. By providing the user interface 108 in the information processing apparatus 100, a user is able to conduct desired processes, for example. The user interface 108 herein may include, for example, buttons, directional keys, rotary selectors such as a jog dial, or a combination of such elements. However, an embodiment of the present invention is not limited to the above.

The display unit 110 is a display means provided in the information processing apparatus 100 that displays various information on a display screen. The screens displayed on the display screen of the display unit 110 may include, for example, images (i.e., video or still images) corresponding to a picture signal received by the communication unit 102, error screens representing errors, and user interface screens for prompting desired user actions to be performed with respect to the information processing apparatus 100. The display unit 110 herein may be a liquid crystal display or organic EL display, for example, but an embodiment of the present invention is not limited to the above. For example, the information processing apparatus 100 may also be configured such the display unit 110 is realized by means of a touch screen. In this case, the display unit 110 functions as an interface display unit capable of both accepting user operations and displaying information.

The audio output unit 112 is an audio output means provided in the information processing apparatus 100 that outputs audio corresponding to audio data processed by the processor 124, for example. The audio output unit 112 may include an amp and one or more speakers, for example, but an embodiment of the present invention is not limited to the above.

By means of the configuration shown by way of example in FIG. 12, the information processing apparatus 100 is able to realize processes (such as the processes shown in FIGS. 10 and 11) in accordance with the above-described approach for improving the playback quality of an audio signal in accordance with an embodiment of the present invention.

In this way, an information processing apparatus 100 in accordance with an embodiment of the present invention uses a received transmission audio signal as a basis for determining whether or not the continuity-related errors exist in the transmission audio signal, and if so, the types of errors involved. Subsequently, the information processing apparatus 100 generates an audio processing command according to the error type, and selectively conducts playback processing according to the audio processing command. Herein, the information processing apparatus 100 determines the existence and type of continuity-related errors on the basis of the bit length of the transmission audio data, the first counter set in the transmission audio data, and the second counter set in the header of the transmission audio signal. Consequently, as shown in the first through third playback processing examples described earlier, the information processing apparatus 100 is able to realize diverse playback processing (i.e., playback processing in the event of an error) according to the determined error type. Moreover, since the information processing apparatus 100 is able to determine errors on the basis of a first counter set in the transmission audio data, the information processing apparatus 100 is able to prevent noise, even when bits are dropped in the transmission audio data, for example. Consequently, the information processing apparatus 100 makes it possible to improve playback quality when playing back an audio signal sent from an external apparatus (i.e., another information processing apparatus 100 fulfilling the role of sending apparatus).

In addition, the information processing apparatus 100 is also able to fulfill the role of a sending apparatus that sends transmission audio signals with first and second counters set therein to an external apparatus (i.e., another information processing apparatus 100 fulfilling the role of receiving apparatus).

The foregoing thus describes an information processing apparatus 100 as an exemplary embodiment of the present invention, but it should be appreciated that an embodiment of the present invention is not limited to the above. An embodiment of the present invention may applied to a variety of equipment, including computers such as a notebook PC, portable communication apparatus such as a mobile phone or PHS (Personal Handyphone System), video and music playback apparatus such as a Walkman™, portable game consoles such as a PlayStation Portable™, and television sets able to receive digital/analog broadcasts.

(Program Product for an Information Processing Apparatus in Accordance with an Embodiment of the Present Invention)

It is also possible to improve playback quality when playing back an audio signal sent from an external apparatus by means of a program product that causes a computer to function as an information processing apparatus in accordance with an embodiment of the present invention.

The foregoing thus describes preferred embodiments of the present invention with reference to the attached drawings. However, it should be appreciated that the present invention is not limited such examples. It is obvious to those skilled in the art that various exemplary modifications and substitutions may be made within the scope as stated by the claims, and it should be appreciated that such modifications and substitutions are naturally to be included in the technical scope of the present invention.

For example, in the information processing apparatus 100 shown in FIG. 12, the controller 106 is shown as being provided with an incoming data determining unit 120, an audio processing command generator 122, and a processor 124. However, the configuration of an information processing apparatus in accordance with an embodiment of the present invention is not limited to the above. For example, an information processing apparatus in accordance with an embodiment of the present invention may also be individually provided with the incoming data determining unit 120, the audio processing command generator 122, and the processor 124 shown in FIG. 12, respectively (each being realized by an individual processing circuit, for example).

Furthermore, although FIG. 12 shows a configuration wherein an audio output unit 112 is provided in the information processing apparatus 100, an embodiment of the present invention is not limited to the above. For example, an information processing apparatus in accordance with an embodiment of the present invention may also cause audio corresponding to received transmission audio data to be output to an external audio output device (such as an external amp and one or more external speakers).

Furthermore, although the foregoing describes providing a program product (i.e., a computer program) for causing a computer to function as an information processing apparatus in accordance with an embodiment of the present invention, an embodiment of the present invention may also be provided as a storage medium storing such one or more such program products.

The foregoing configurations illustrate exemplary embodiments of the present invention, and are naturally to be included in the technical scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:

a communication unit configured to communicate with an external apparatus that splits outgoing audio data and sequentially sends transmission audio signals, each signal having a header corresponding to one of the split sets of audio data, as well as transmission audio data made up of one of the split sets of audio data with an appended first counter;

an incoming data determining unit configured to determine the existence of continuity-related errors in a transmission audio signal received by the communication unit, the determination being made on the basis of the value of the first counter contained in the received transmission audio signal, as well as the value of a second counter identifying the transmission audio signal and contained in the header; and an audio processing command generator configured to selectively generate an audio processing command on the basis of the determination results in the incoming data determining unit, wherein the audio processing command stipulates audio data playback processing in the event of an error, wherein the first counter is apportioned among a plurality of channels, and the second counter is a field counter.

2. The information processing apparatus according to claim 1, wherein the incoming data determining unit relays determination results to the audio processing command generator indicating that a reception error occurred with respect to the transmission audio signal in the case where the bit length of the transmission audio data contained in the transmission audio signal currently being processed is less than the bit length of the outgoing audio data, and the audio processing command generator generates an audio processing command corresponding to determination results indicating a reception error.

3. The information processing apparatus according to claim 1, wherein in the case where the value of the second counter contained in a given transmission audio signal currently being processed is not consecutive with the value of the second counter contained in another transmission audio signal received subsequent to the given transmission audio signal, the incoming data determining unit relays to the audio processing command generator a first determination result indicating that the received transmission audio signals are not consecutive, and on the basis of the first determination result, the audio processing command generator generates an audio processing command corresponding to the first determination result.

4. The information processing apparatus according to claim 1, wherein in the case where the value of the second counter contained in a given transmission audio signal currently being processed is not consecutive with the value of the second counter contained in another transmission audio signal received immediately prior to the given transmission audio signal, the incoming data determining unit relays to the audio processing command generator a second determination result indicating that the received transmission audio signals are not consecutive, and on the basis of the second determination result, the audio processing command generator generates an audio processing command corresponding to the second determination result.

5. The information processing apparatus according to claim 1, further comprising:

a processor configured such that, on the basis of an audio processing command generated by the audio processing command generator, the processor selectively applies playback processing in accordance with the audio processing command to transmission audio data contained in the received transmission audio signal.

6. The information processing apparatus according to claim 5, wherein the processor splits outgoing audio data to be sent to an external apparatus, and causes the communication unit to sequentially send transmission audio signals, each signal having a header containing the second counter corresponding to one of the split sets of audio data, as well as transmission audio data made up of one of the split sets of audio data with the appended first counter.

7. The information processing apparatus according to claim 6, wherein the processor splits the audio data for each field of a picture signal to be sent synchronized with the outgoing audio data.

8. An audio signal processing method, comprising the steps of:

receiving a plurality of transmission audio signals sent from an external apparatus that splits outgoing audio data and sequentially sends transmission audio signals, each signal having a header corresponding to one of the split sets of audio data, as well as transmission audio data made up of one of the split sets of audio data with an appended first counter;

determining the existence of continuity-related errors in a transmission audio signal received in the receiving step, the determination being made on the basis of the value of the first counter contained in the received transmission audio signal, as well as the value of a second counter identifying the transmission audio signal and contained in the header;

selectively generating an audio processing command on the basis of the determination results in the determining step, wherein the audio processing command stipulates audio data playback processing in the event of an error; and on the basis of the audio processing command that was selectively generated in the generating step, selectively applying playback processing in accordance with the audio processing command to the received transmission audio signal, wherein the first counter is apportioned among a plurality of channels, and the second counter is a field counter.

9. A non-transitory computer-readable medium having stored thereon a computer-readable program product that causes a computer to execute the steps of:

receiving a plurality of transmission audio signals sent from an external apparatus that splits outgoing audio data and sequentially sends transmission audio signals, each signal having a header corresponding to one of the split sets of audio data, as well as transmission audio data made up of one of the split sets of audio data with an appended first counter;

determining the existence of continuity-related errors in a transmission audio signal received in the receiving step, the determination being made on the basis of the value of the first counter contained in the received transmission audio signal, as well as the value of a second counter identifying the transmission audio signal and contained in the header;

selectively generating an audio processing command on the basis of the determination results in the determining step, wherein the audio processing command stipulates audio data playback processing in the event of an error; and on the basis of the audio processing command that was selectively generated in the generating step, selectively applying playback processing in accordance with the audio processing command to the received transmission audio signal, wherein the first counter is apportioned among a plurality of channels, and the second counter is a field counter.

* * * * *